United States Patent
Werthwein

(10) Patent No.: US 9,175,708 B2
(45) Date of Patent: Nov. 3, 2015

(54) SCREW

(75) Inventor: Bernd Werthwein, Forchtenberg-Sindringen (DE)

(73) Assignee: Arnold Umformtechnik GmbH & Co. KG, Forchtenberg-Ernsbach (DE)

(*) Notice: Subject to any disclaimer, the term of this patent is extended or adjusted under 35 U.S.C. 154(b) by 164 days.

(21) Appl. No.: 13/001,649

(22) PCT Filed: Jul. 3, 2009

(86) PCT No.: PCT/EP2009/058422
§ 371 (c)(1),
(2), (4) Date: Feb. 4, 2011

(87) PCT Pub. No.: WO2010/003901
PCT Pub. Date: Jan. 14, 2010

(65) Prior Publication Data
US 2011/0289752 A1 Dec. 1, 2011

(30) Foreign Application Priority Data
Jul. 7, 2008 (DE) .......................... 10 2008 033 509

(51) Int. Cl.
*F16B 25/00* (2006.01)
*F16B 25/10* (2006.01)

(52) U.S. Cl.
CPC ............ *F16B 25/10* (2013.01); *F16B 25/0021* (2013.01); *F16B 25/0078* (2013.01); *F16B 25/106* (2013.01); *Y10T 29/49826* (2015.01)

(58) Field of Classification Search
CPC .. F16B 25/00; F16B 25/0021; F16B 25/0047; F16B 25/0078; F16B 25/103; F16B 25/0084; F16B 25/0031; F16B 25/10; F16B 25/0015; F16B 25/0057; F16B 35/047; F16B 33/02; F16B 15/00; F16B 19/14; F16B 15/06; A61B 17/863
USPC ........... 411/386, 387.1–387.4, 414, 416, 426, 411/440, 493
See application file for complete search history.

(56) References Cited

U.S. PATENT DOCUMENTS

| | | | | |
|---|---|---|---|---|
| 2,352,982 A * | 7/1944 | Tomalis | ........................ | 411/422 |
| 3,094,894 A * | 6/1963 | Broberg | ..................... | 411/387.4 |
| 3,094,895 A * | 6/1963 | Broberg | ..................... | 411/387.2 |
| 3,156,152 A * | 11/1964 | Reed | ............................. | 411/386 |
| 3,246,556 A * | 4/1966 | Phipard, Jr. | ................... | 411/416 |
| 3,877,339 A * | 4/1975 | Muenchinger | ................ | 411/372 |
| 3,918,345 A * | 11/1975 | Phipard, Jr. | ................... | 411/416 |
| 4,040,328 A * | 8/1977 | Muenchinger | ................ | 411/412 |
| 4,179,976 A * | 12/1979 | Sygnator | ...................... | 411/413 |
| 4,948,312 A | 8/1990 | Jochum | | |

(Continued)

FOREIGN PATENT DOCUMENTS

| | | |
|---|---|---|
| DE | 196 37 069 A1 | 3/1998 |
| DE | 298 01 813 U1 | 3/1998 |

(Continued)

*Primary Examiner* — Gary Estremsky
(74) *Attorney, Agent, or Firm* — Boyle Fredrickson, S.C.

(57) ABSTRACT

A screw with a polygonal cross section comprises a threaded section and a non-threaded section that extends from the threaded section to a front, rounded screw tip. The sideline of the non-threaded section runs smoothly and without interruption from the threaded section to the tip at a constant curvature. The screw is used to attach an element to a panel component, wherein the screw itself produces the hole in the panel component and forms the threads.

13 Claims, 3 Drawing Sheets

(56) References Cited

U.S. PATENT DOCUMENTS

| | | | |
|---|---|---|---|
| 5,044,855 A * | 9/1991 | Fukubayashi | 411/386 |
| 5,234,301 A * | 8/1993 | Grossberndt et al. | 411/386 |
| 5,252,016 A * | 10/1993 | Schmid et al. | 411/386 |
| 5,361,478 A | 11/1994 | Grossberndt et al. | |
| 5,795,120 A * | 8/1998 | Hurdle | 411/386 |
| 5,863,167 A * | 1/1999 | Kaneko | 411/426 |
| 6,340,277 B1 * | 1/2002 | Koenig et al. | 411/416 |
| 6,494,656 B1 * | 12/2002 | Boyer et al. | 411/399 |
| 6,764,263 B2 * | 7/2004 | Carlo | 411/386 |
| 2002/0159414 A1 | 10/2002 | Kanemoto et al. | |
| 2003/0049095 A1 * | 3/2003 | Boyer et al. | 411/416 |
| 2007/0130741 A1 | 6/2007 | De Traglia Amancio Filho | |
| 2008/0222873 A1 | 9/2008 | Draht et al. | |

FOREIGN PATENT DOCUMENTS

| | | |
|---|---|---|
| DE | 196 53 394 A1 | 6/1998 |
| DE | 196 34 417 C2 | 12/1998 |
| DE | 10 2004 046 427 A1 | 4/2006 |
| DE | 10 2006 058 464 A1 | 12/2007 |
| DE | 10 2006 034 583 A1 | 1/2008 |

* cited by examiner

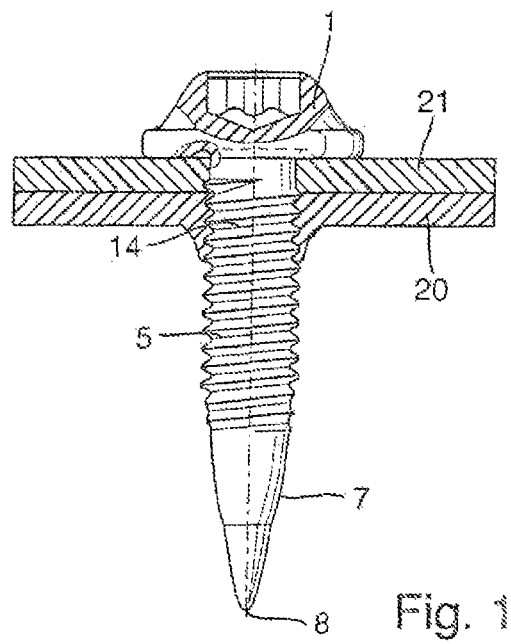
Fig. 10
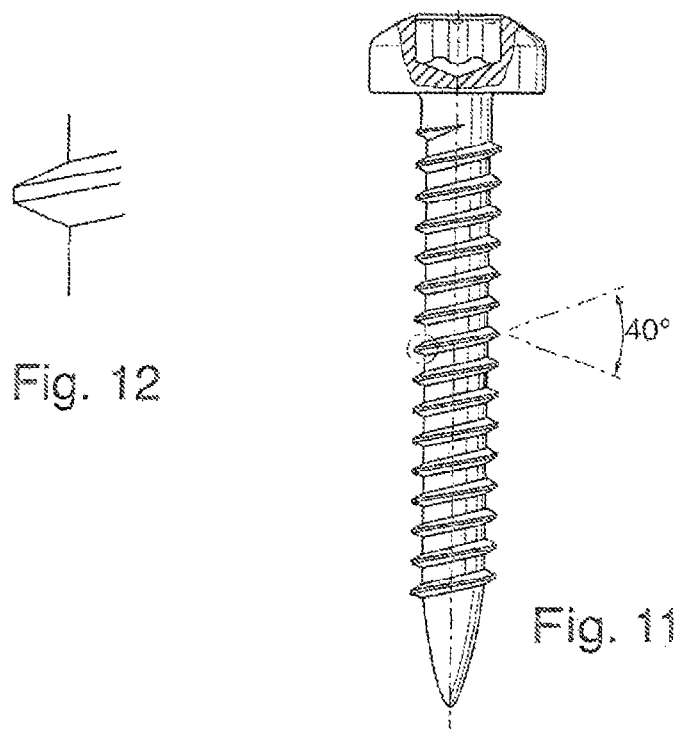
Fig. 12
Fig. 11

SCREW

BACKGROUND ART

The invention relates to a thread-forming screw.

Sheet metal components to be connected detachably with one another are generally screwed together by means of sheet metal screws or modified thread elements. In general, the screw connection requires that the component as well as the part to be clamped be perforated. The component can be perforated by means of drilling, punching, deep drawing or the like. The threads are pre-formed and/or pre-cut or formed by the screw itself during the drive-in process.

A hole- and thread-forming screw is already known, which incorporates a screw shaft with a threaded section and an adjoining thread-free part. The thread-free part of the screw shaft features a cylindrical form in the part where the thread adjoins, thus, it does not change in diameter. This cylindrical part should feature a length corresponding to four-fold of the sheet metal thickness. The screw tip is spherically formed (DE 3909725).

Likewise known is a thread-forming screw with a cylindrical, threaded section and a conical tip that ends in an actual sharp tip. A turn of thread is provided in the screw tip section (DE 10 2006 058 464).

The invention is based on the task to develop a thread-forming screw with respect to improved properties.

SUMMARY OF THE INVENTION

In contrast to the current state of technology, the thread-free section decreases in diameter directly at the end of the thread. This, at least partially thread-free section with decreasing diameter serves to form a passage after producing a hole that serves for better holding the thread in the material. This section is therefore called the hole-forming section.

In an embodiment of the invention, it can be facilitated that the thread's edge of the screw shaft in a projection perpendicular to a plane of the longitudinal axis of the screw deviating from a circular form embodies a polygon, particularly a triangle with rounded corners and convex sides, thus a form designated also as polylobular.

Particularly, it is proposed that also the core cross-section of the threaded section of the screw features such a form.

In an embodiment of the invention, it can be facilitated that the threaded section of the screw shaft features a first, in fact the groove, section adjoining the forming section and an adjoining second holding section extending up to the screw head. It can be facilitated that the cross-section through the screw shaft in the holding section is less polygon-shaped than in the groove section. Particularly, the holding section can feature a circular cross-section. This takes into account that the groove section in the first place is intended for forming a thread in the formed passage, without the screw-in resistance being too great. In the holding section, which is located directly below the screw head, is where the actual fastening of the element to be screw-connected should take place.

In yet another embodiment of the invention, it can be facilitated that the cross-section of the thread-free shaft section of the screw features the form of a polygon, particularly of a triangle with rounded corners and convex-shaped sides.

In a preferred embodiment, the screw features over its entire length, if applicable, with exception of the holding sections, such a polylobular cross-section.

The external diameter of the threaded section can be formed with decreasing diameter directly prior to the forming section.

The sideline of the forming section can extend at least partially straight-lined, so that the forming section is formed cone-shaped.

However, it is also possible that the sideline of the forming section extends in a curvature, whereby it can involve a constant curvature or also two sections with different but constant curvature.

The forming section can be entirely thread-free or partially thread-free. For instance, starting from its front end, the screw tip can feature a thread that initially extends over a few thread turns at which a smooth-surfaced section then adjoins. These first thread turns allow the screw to penetrate easily into the material in which it should form a hole. The adjoining thread-free section enlarges this hole.

It is also possible that the forming section, starting from the tip, first remains smooth but just before it reaches the groove section a thread is provided in the forming section whereby the thread height increases gradually.

As particularly reasonable, it has been proven when the thread involves a round thread.

The screw proposed by the invention can find application not only in sheet metals but also in fibrous composite materials and in plastics, and for fastening objects made of combined materials.

Further features, details and advantages of the invention result from the claims and summary, the wording based on reference to the contents of the description, the following description of preferred embodiments of the invention, as well as the drawing. Shown hereby:

BRIEF DESCRIPTION OF THE DRAWINGS

FIG. 10 is a driven-in screw;

FIG. 11 is a side view of a screw according to a further embodiment; and

FIG. 12 is a detail of the thread of the screw of FIG. 11.

Figure 1:
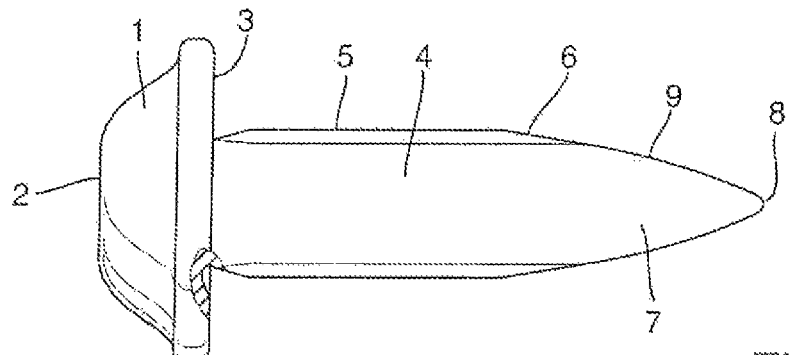
FIG. 1 is a side view of the screw proposed by the invention.

The screw represented in FIG. 1 contains a screw head 1 that features a depression in its end face 2 that serves for driving the screw. It would also be possible that a protrusion is provided as a screw drive.

DETAILED DESCRIPTION

From the underside 3 of the screw head 1 lying in a plane, a screw shaft 4 extends in the middle, which, starting from the screw head 1, is first cylindrical in form and features a thread 5. The thread then runs out in a relatively short section 6. This section involves the so-called groove zone. It is at this section designated with thread 5 that the thread-free hole-forming section 7 then adjoins, which runs out in a rounded tip 8. The outside contour 9 of the thread-free hole-forming section 7 seen in FIG. 1 extends throughout in a curvature, and in fact in a constant curvature. Altogether, the thread-free hole-forming section 7 forms a ballistic tip.

Figure 2:
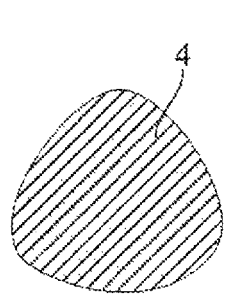
FIG. 2 is a transverse cross-section through the screw.

FIG. 2 shows a cross-section through the screw shaft. At the same time, for reasons of simplification, the shape of the outside diameter of the thread was transferred into a plane. One sees therefore that the cross-section is formed through the screw shaft, from a triangle with rounded corners and convex shaped sides. Such a form is designated also as a trilobular form.

This cross-section form is incorporated in the screw both in the core of the threaded section as well as in the outside diameter of thread 5 as well as in the thread-free section 7.

Figure 3:
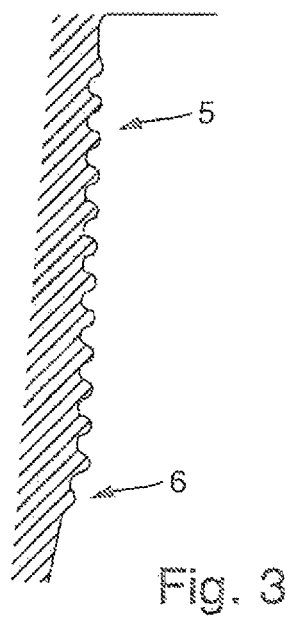
FIG. 3 is an axial section in enlarged scale.

FIG. 3 shows a partial section in an enlarged scale through the threaded section of the shaft 4 of the screw. It is seen here that the thread 5 is a round thread in which the thread turns are rounded both at the protrusions as well as at the depressions.

Figure 4:
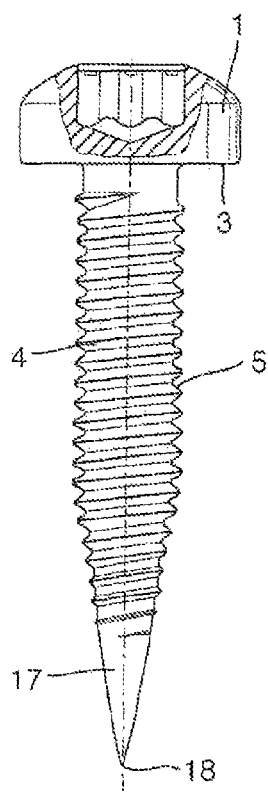
FIG. 4 is a side view of a screw according to a second embodiment.

While FIG. 1 shows a screw on which the front hole-forming section 7 completely remains thread-free, FIG. 4 shows a side view of a screw on which the front groove section 17, from a sharp edged tip 18, first of all remains thread-free on which then, a section adjoins, on which a thread gradually forms, until it transfers to the shaft section 4 with a completely formed thread.

Figure 5:
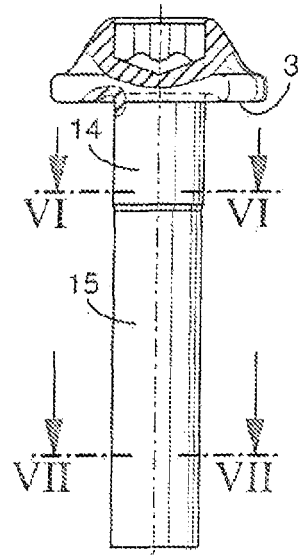
FIG. 5 is the side view of a brad provided with a head.
Figure 8:
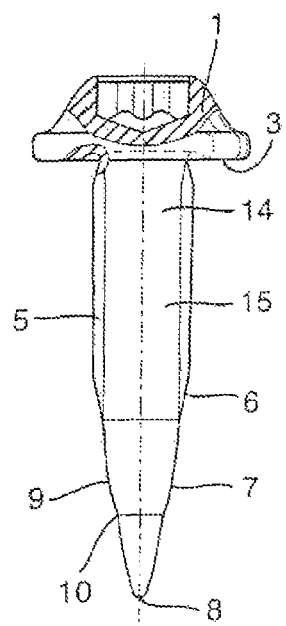
FIG. 8 is a side view of a screw according to a further embodiment.
Figure 6:
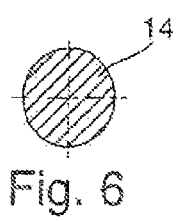
FIG. 6 is a transverse cross-section through the brad along line VI-VI.
Figure 7:
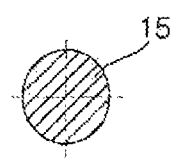
FIG. 7 is a transverse cross-section through the brad along line VII-VII.

In the following passage, FIG. 5 is now dealt with, which shows a manic piece out of which the represented screws are produced. While, in the side views, one cannot obviously recognize different cross-section forms, this is more possible in the representation of the starting product. As a starting product for the production of a screw, a wire is used, on which first of all a screw head 1 is formed. This screw head 1 is represented in FIG. 5 partially depicted in a section so that one can also see the depression provided in the head for driving the screw. Directly beneath the underside of the screw head 1, the wire features a cross-section somewhat larger in diameter. The length of this section 14 corresponds approximately to the diameter. On this first section 14, the remaining part of the wire then adjoins where the diameter is somewhat smaller than in the upper area. From FIGS. 6 and 7, one can see that at this stage of production of the screw also the cross-section form of both sections divided by a step is different. In the section 14 that directly adjoins the screw head, the cross-section, for example, is completely circular while it features the already-mentioned polygonal form in the other section. These two different cross-section forms and cross-section sizes are retained after rolling the thread. Thus, the screw represented in FIG. 8 once again shows a holding section 14 adjoining at the screw head, at which the groove section 15 then adjoins, in which the cross-section features the polygonal form. This polygonal form continues also over the hole-forming section 7 up to the screw tip 8. In the embodiment of FIG. 8, the hole-forming section 7 further comprises two sub-sections in which the side profile 9 is curved as it extends through both sections, with a different curvature in each respective sub-section, thus forming an indentation 10 between the two sub-sections.

Figure 9:
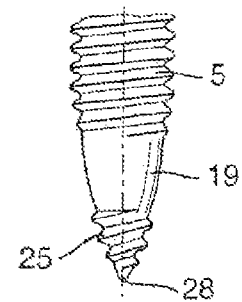
FIG. 9 is the front section of a screw according to yet another embodiment.

In the embodiment represented in FIG. 9, only in the front area of the screw proposed by the invention, directly at the screw tip 28, a thread extending over about two thread turns 25 is provided on what is then adjoined by a thread-free part 19 of the forming section. Only in the transition to the cylindrical thread, section 4 is then again the shaft thread 5 provided. This front thread 25 also serves to accelerate and improve the penetration of the screw into the material in which a hole is supposed to be formed. As soon as the screw is penetrated, the thread-free part in addition serves to remodel the hole into a passage. In this passage, the thread is then formed through the groove section.

FIG. 11 shows a side view of a further embodiment of the screw, whereby the screw features a so-called plastic thread. A gap is provided between the individual screw turns. The tip angle of the thread, as indicated to the right in FIG. 11, is about 40°. The thread is symmetrical. It forms no sharp thread edge, but rather a flattening that is seen to the left in FIG. 12.

Use of the Described Screw:

The type of the connection of the screw proposed here can be clarified best with reference to FIG. 10. As an example, the screw of FIG. 8 is used in the process. The screw with the ballistic tip that is formed in the cross-section as triangle-shaped with rounded corners and sides is pressed under high pressure on the components to be connected and driven with the help of a screwdriver or such a tool at high speed. Through the friction heat that emerges thereby, the component becomes plastically malleable so that the ballistic tip can penetrate through the component materials. The approached triangle cross-section with rounded corners after penetration of the tip at this time ensures that it still rotates very fast; it is therefore pressed at high pressure, but it is only supported frictionally on the circumference point-by-point. Thus avoiding a welding effect between the screw and the component.

When the tip has penetrated almost completely into the component, and a kind of passage has emerged simultaneously, the speed decreases based on the increasing resistance to the normal screw-driving speed. At the same time, the contact pressure is reduced. Now the first thread turn of the thread 5 engages into the component so that a compulsive feed occurs. Thus, the process of forming the thread begins.

The thread features also the prior-mentioned triangular profile with rounded corners. This profile has also the advantage through the frictional contact that does not occur along an entire circumference but rather only at particular points that lower frictional resistance and therefore lower screwing torque occurs. Simultaneously, the component material in which a thread hole is formed in this manner features a tendency to spring back inwards. Thus, a kind of self-retention is produced, which, in addition, leads to the screw connection being secured against unintentional loosening.

The result can be derived from FIG. 10. Here it is recognized that in the second sheet metal 20, on which the first sheet metal 21 is supposed to be fastened, a passage was formed, which forms a longer wall in the axial direction, in which the thread of the screw engages. This part of the screw shaft corresponds to the holding section 14 clarified with reference to FIG. 5.

I claim:

1. A hole-forming and thread-forming screw with a screw head that has a screw-driving formation for rotational driving by a screwdriver or tool at high speed, a screw shaft that has a threaded groove section and a hole-forming section extending from the threaded groove section and having a thread-free portion extending towards a thread free screw tip, wherein a transverse cross-section of the hole-forming section continuously decreases as it extends from a full diameter of the screw shaft in a direction towards the screw tip, further wherein the hole-forming section includes a first sideline section having a first curvature, a second sideline section having a second curvature different from the first curvature, and an indenture formed by the transition from the first curvature to the second curvature, wherein the first and second sideline sections are directly adjacent to each other;

wherein the screw shaft has a threaded edge inscribed along the threaded groove section of the screw shaft, the threaded groove section extending to the hole-forming section of the screw shaft, the threaded groove section and the threaded edge having a transverse cross-section in a form of a polygon, particularly a triangle with rounded corners and convex curved sides; and wherein the screw shaft has a holding section extending towards the screw head, wherein the threaded groove section extends from the holding section to the hole-forming section, and wherein the transverse cross-section of the screw shaft in the holding section is formed to be closer to circular than the polygonal cross-section of the threaded groove section.

2. The screw according to claim 1, wherein the transverse cross-section of the hole-forming section has a shape of a triangle with rounded corners and convex sides.

3. The screw according to claim 1, wherein an outside diameter of a thread of the threaded groove section decreases in a threaded transition from the threaded groove section to the thread-free portion of the hole-forming section.

4. The screw according to claim 1, wherein the forming section is thread-free starting from the screw point and features a thread with increasing thread height before the threaded section.

5. The screw according to claim 1, wherein the thread of the screw shaft is formed as round thread.

6. The screw according to claim 1, wherein the thread of the screw shaft is formed as metric thread.

7. The screw according to claim 1, wherein the thread of the screw shaft is formed as sheet metal thread.

8. The screw according to claim 1, wherein a thread of the threaded groove section of the threaded groove section is formed as a self-cutting thread.

9. The screw according to claim 1, wherein the thread of the screw shaft is formed as asymmetric thread.

10. The screw according to claim 1, wherein the thread of the screw shaft is formed as rough thread.

11. The screw according to claim 1, wherein the thread of the screw shaft is formed as left-hand thread.

12. A method of use of a screw according to claim 1, to screw into fibrous composite materials.

13. A method of use of a screw according to claim 1 to screw into a plastics material.

* * * * *